(No Model.)
C. A. BANZET & C. H. BERGER.
FRUIT GATHERER.
No. 565,101. Patented Aug. 4, 1896.
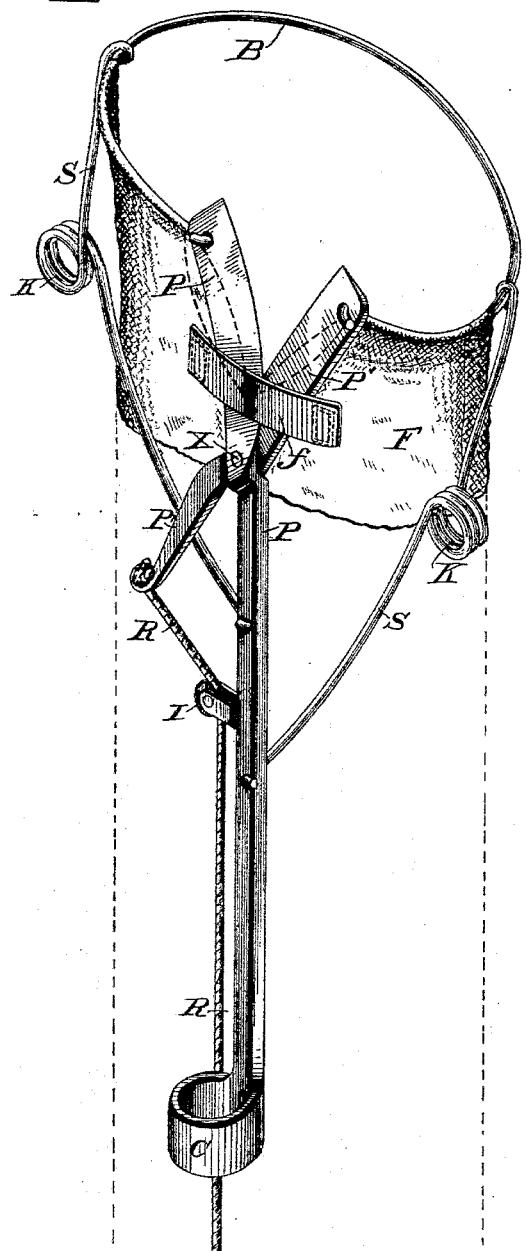
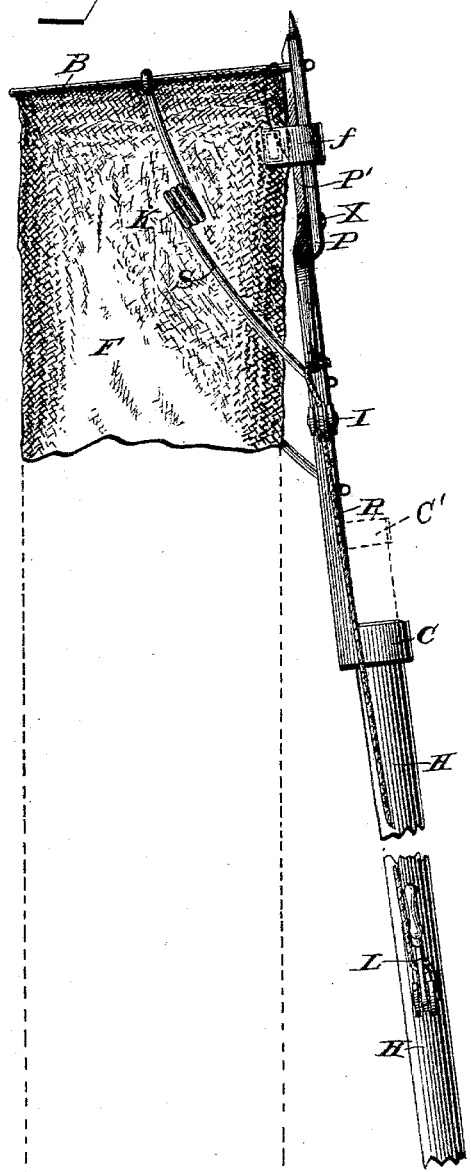
Witnesses:
Inventors:
Charles A. Banzet,
Charles H. Berger,
by Collamer & Co.,
Attorneys.

UNITED STATES PATENT OFFICE.

CHARLES A. BANZET AND CHARLES H. BERGER, OF ELM CITY, KANSAS.

FRUIT-GATHERER.

SPECIFICATION forming part of Letters Patent No. 565,101, dated August 4, 1896.

Application filed March 26, 1896. Serial No. 584,974. (No model.)

*To all whom it may concern:*

Be it known that we, CHARLES A. BANZET and CHARLES H. BERGER, citizens of the United States, residing at Elm City, in the county of Labette and State of Kansas, have invented certain new and useful Improvements in Fruit-Gatherers; and we do hereby declare the following to be a full, clear, and exact description of the invention, such as will enable others skilled in the art to which it appertains to make and use the same.

This invention relates to harvesters, and more especially to that class thereof known as "fruit-gatherers;" and the object of the same is to provide improved means for holding open and in proper position the mouth of the fruit-receptacle while at the same time holding the cutting-shears with their blades normally separated.

To this end the invention consists of a handle carrying the well-known shears, to whose upper extremities are attached the ends of the bow-spring that stands in a plane at approximately right angles to the length of the shears, and in two oblique supporting-springs connected at their lower ends with the shank of the fixed blade and at their upper ends with opposite sides of the bow-spring, so as to hold the latter in proper position and yet permit it to yield as the shears are closed.

The preferable construction of the device which embodies the above idea is described in the following specification and illustrated in the drawings hereto attached, and in which—

Figure 1 is a perspective view of this device as seen from the front and in position for use. Fig. 2 is a side elevation thereof.

Referring to the said drawings, the letter P designates the fixed blade of a pair of shears, which has an elongated shank, as shown, and is provided at its lower end with a collar C, which receives the end of a long handle H, as is usual, and I is a pulley or a plain eye carried at one side of said shank. P' is the other or movable blade of the pair of shears, crossing and pivoted to the first at X and having an eye in its lower end, and R is a cord or rope leading from this eye through the pulley I and alongside the handle to the usual lever L, attached to the latter near its lower end. The construction is such that the handle is used to raise the shears to the proper point and pass the stem of the fruit between the cutting edges of the blades, after which the lever L is manipulated to draw on the rope R and move the blades so as to sever the stem.

Coming now more particularly to the present invention, which is designed to present improved means for supporting the well-known chute or receptacle F, here shown as a flexible tube leading either to the ground or to the operator's hand, the letter B designates a bow-spring, as of stiff wire, whose ends are slightly separated and are connected with the blades P P' of the shears near their upper ends, as seen, and this bow stands at approximately right angles to the length of the shears and supports the upper end of the tubing F, the latter being slit where the shears occur and its sides connected by a tab *f* to prevent tearing. In order to hold this bow in proper position, two supports S are provided, which supports may themselves be of spring-wire, if desired. The lower ends of these supports are connected with the shank of the fixed blade P at points respectively below and above the pulley I, as seen. Their bodies may have coils K, if they are made of spring-wire, and their upper ends are attached to the opposite sides of the bow at points remote from its connection with the upper extremities of the blades.

In operation the device is raised to the proper point to pass the stem of the fruit between the cutting edges of the blades at a point some little distance from the fruit itself, the supports S holding the bow at right angles to the shears, as will be clear. The lever L is then manipulated to draw on the rope R, and the shears cut the stem, so that the fruit falls into the tubing F and slides down the same either to the operator's hand or into a basket. As the shear-blades come together the bow springs, so that its resiliency causes the blades to again open when the pull on the cord R is released, and if the supports S are also of spring-wire they will assist this motion. Otherwise they will be pivoted at their lower ends in the shank of the fixed blade, so that as their upper ends are approximated they merely swing around these pivots, but at all times they will hold the bow in proper position for receiving fruit as it is cut.

All parts of this device are of the desired sizes, shapes, proportions, and materials, and considerable change in and addition to the specific details of construction may be made without departing from the principles of our invention. For instance, it may be desired to have an additional collar, as indicated in dotted lines at C' in Fig. 2, so that the handle H may pass up through two collars and afford a firmer connection with the head of the device.

What is claimed as new is—

1. In a fruit-gatherer, the combination with the shears, a handle supporting one blade, and means for swinging the other blade; of a bow-spring having its ends slightly separated and attached to the shear-blades near their extremities and its body standing approximately at right angles to the length of the shears, and a flexible chute carried by said bow, as and for the purpose set forth.

2. In a fruit-gatherer, the combination with the shears, a handle supporting one blade, and means for swinging the other blade; of a bow having its ends attached to the blades near their extremities, a flexible chute attached to and leading from the bow, and oblique supporting-springs connected at their lower ends with the shank of the fixed blade, having coils in their bodies, and attached at their upper ends to the opposite sides of the bow, as and for the purpose set forth.

3. In a fruit-gatherer, the combination with the shears, a handle supporting one blade, and means for swinging the other blade; of a bow-spring having its ends attached to the blades near their extremities and its body standing at right angles to the length of the shears, a flexible chute attached to and leading from the bow downward, and oblique supporting-springs connected at their lower ends with the shank of the fixed blade and at their upper ends with the sides of the bow, as and for the purpose set forth.

4. In a fruit-gatherer, the combination with the shears one member of which has an elongated shank supported by a handle, a pulley carried by this shank, and a cord leading from the lower end of the other member through the pulley to the ground; of a spring connected at its ends with the shear-blades near their upper extremities, a fruit-receptacle carried by such spring, and two oblique supporting-springs attached at their upper ends to the sides of the first-mentioned spring, and connected at their lower ends with the shear-blade shank at points respectively above and below said pulley, as and for the purpose set forth.

5. In a fruit-gatherer, the combination with an upright pair of shears supported on a handle, means for operating the movable blade thereof, and a bow whose ends are connected with the extremities of the blades; of a tubular fabric chute whose upper end is attached to said bow and whose side is slit opposite the shear-blades, and a flexible tab connecting the sides of the slit and passing across the shears, substantially as described.

In testimony whereof we affix our signatures in presence of two witnesses.

CHARLES A. BANZET.
CHARLES H. BERGER.

Witnesses:
AMOS A. KING,
FRANK W. BANZET.